Figure 2:
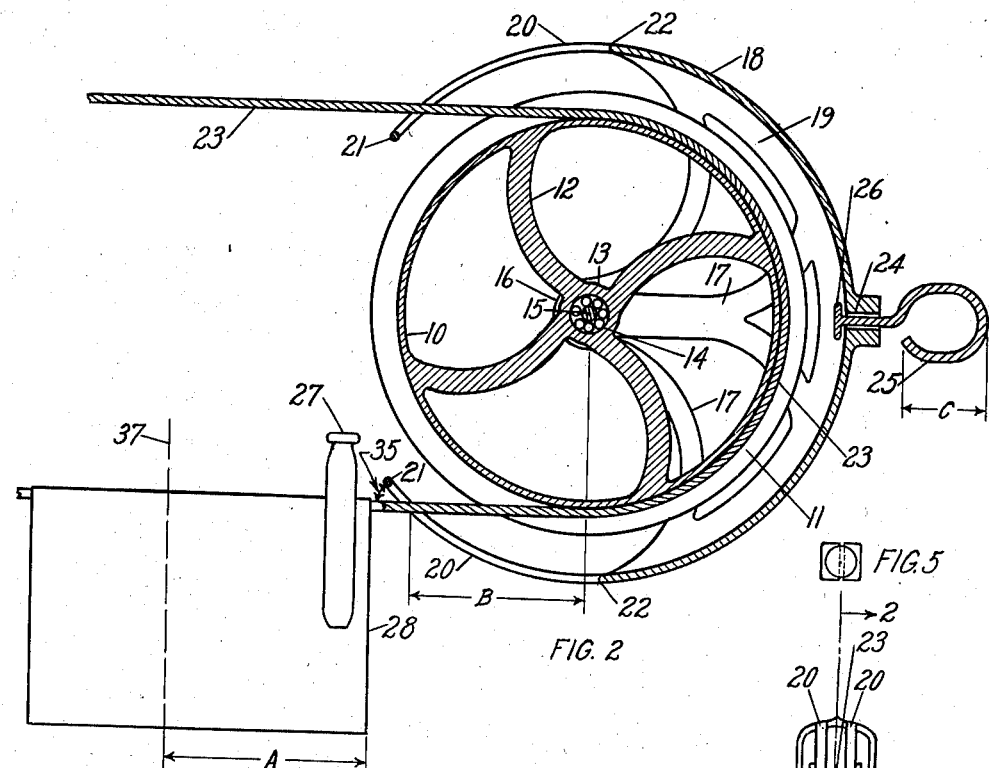

July 2, 1940.                O. McC. MANNING                2,206,327
PULLEY
Filed Aug. 16, 1938

FIG. 4. Force on bearings
Half of weight of system
Angle of inclination of wire

Inventor
Odessa McCann Manning
Attorney:— William D. Hall

Patented July 2, 1940

2,206,327

UNITED STATES PATENT OFFICE 2,206,327

PULLEY

Odessa McCann Manning, Elkins, W. Va.

Application August 16, 1938, Serial No. 228,619

3 Claims. (Cl. 254—197)

This invention relates to pulleys, particularly those of the type used with "endless" clotheslines. A clothesline is likely to jump off of ordinary pulley wheels and when this occurs considerable time and effort is required to replace it especially if the pulley is located in an inaccessible place such as on a pole. My invention utilizes guides to prevent the line from jumping the wheel and although my guides are not broadly new they do, however, satisfy the primary object of this invention which is to provide such a shape for pulley guides that they may be cast integrally with (or otherwise permanently secured to) a pulley housing of the type that extends around the periphery of a pulley for at least 180 degrees.

One well known method of constructing pulley housings is to employ two separate side pieces between which the pulley wheel is inserted. The pieces are then bolted together. Hence, it is necessary to disassemble the housing to remove (or insert) the wheel. With such a construction the housing is not only weak but large stresses are likely to exist therein should the bolts become loose thereby disaligning the side pieces. Heretofore it has been necessary to face these disadvantages and build the housings in more than one piece for with the prior constructions the wheel cannot be inserted in a completely assembled housing. With the pulley constituting my invention the wheel may be removed from the housing for repairs, painting, etc., without disassembling the housing, and notwithstanding the changes which accomplish this important improvement my invention does not sacrifice any of the advantages of conventional housings, in fact, it enables a few new results to be attained. These new results satisfy secondary objects of my invention such as for example, providing means which acts as a stop for a clothespin and thereby prevents the clothesline from being advanced so far that the clothing will be caught in or soiled by the pulley. A further object is to provide a guard ring which during installation of the pulley on the pole permits the clothesline to be threaded through the housing by merely inserting the line in one of the guide slots and continuing to advance it. The line may be thus threaded through the device with but one hand, a great advantage when the pulley is being installed on a pole. Other objects and advantages of my invention will appear as this description proceeds.

In carrying out the foregoing objects I employ inclined slotted guides which are cast integrally with the guard rim of the housing. The slots are narrower than the wheel and also narrower than a clothespin. When the operator desires to use the full length of the line it is possible to stand at one end thereof and hang all the clothes by merely advancing the line as each piece is pinned thereto. When the pin which holds the first piece of clothing strikes the line-guide the operator is able to detect a sudden increase in restraining force which indicates to him that further advancement of the line might soil or damage the clothes. To enable this indication to be clear and definite, especially when the line is heavily laden with clothes, the wheel should be free in its operation and should therefore preferably be equipped with ball or roller bearings at the shaft. Even if the clothespin is not pinned to the edge of the clothing as it usually would be, the pin will still strike my line guides before the clothing touches the pulley (or its housing).

Figure 3:
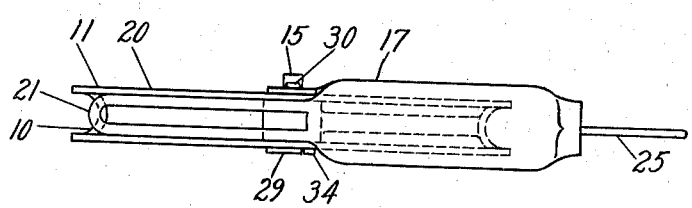
Figure 6:
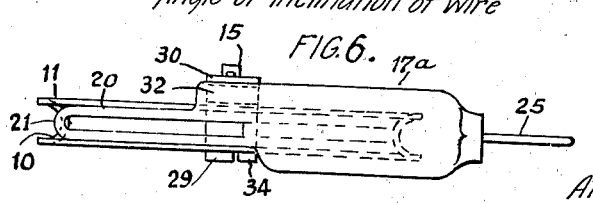
Figure 1:
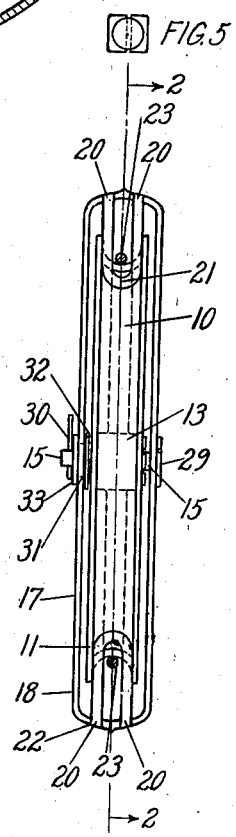

The details of my invention can best be understood by referring to the accompanying drawing of which Figure 1 is a front view of my new pulley. Figure 2 is a section of the device on line 2—2; Fig. 1, with the added showing in full view of a clothespin and a piece of clothing. Figure 3 is a top view of my invention. Figure 4 is a vector diagram of the forces exerted on a pulley, and Figure 5 is a top view of the clothespin of Figure 2. By comparing this view of the clothespin 27 with the slotted line guides 20 of Figure 1 it is possible to see the relative size of the clothespin and the slotted line guides. Figure 6 is a top view of an improved form of this invention.

The above-mentioned drawing was drawn to scale from an actual pulley which has an overall diameter 22, 22 of about eleven inches. In Figures 1 to 3, a shaft 15 is surrounded by bearings 14 which are encased by the hub 13 of wheel 10. The wheel is preferably constructed as a one-piece casting with four spokes 12 connecting its hub 13 to the rim 11. The shaft is supported at its right end by the hub 16 of housing 17 and at its left end by washer 33 which has a boss projecting through the housing 17 as is indicated by the dotted lines 31. The housing, in addition to ribs 17, has an outer guard ring or fender 18, 19, 20 that extends around the periphery of the wheel 10 for about 280 degrees. Between its tip end 21 and the point 22, the fender 18 is slotted to form a guide for the wire 23. My extended tests, conducted under actual operating conditions, have demonstrated that this guiding means absolutely prevents the clothesline 23 from jumping the wheel.

The wire 23 passes through the upper slot 20, 20, around the groove 10 of the wheel, and finally out the lower slot 20, 20. During installation of my pulley, the line 23 may be threaded through the housing by placing it in the upper slot 20, 20 and continuing to advance it. The drawing shows the maximum size of wire, in relation to the width of the guide slot, that I recommend. The wire 23 may be smaller, however.

While the housing 17 may be cast in one piece, it is possible to construct the U-shaped guides 20 of wrought iron and weld them to fender 18 at point 22. In this variation, the housing would be in three pieces, namely a rim 18 which is integral with the ribs 17, an upper guide member 20, and a lower guide member 20. To insert and remove the wheel it is merely necessary to bend these guides into a position in which they do not prevent the wheel from being inserted or removed. This form of my invention is the one from which Figure 3 of the accompanying drawing was made.

By making the housing 17, 17 wider than it is shown in Figure 3, I am enabled to slip the wheel 12 in and out of the housing without bending the guides 20 or in any way disassembling the housing. With a wide housing, namely one in which at least one of the side pieces is offset appreciably from the wheel, it is possible upon removing the shaft to take the wheel in and out of the side of the housing. In Figure 6 a wide housing is shown and it is possible to insert and remove the wheel by merely removing the shaft, inclining the wheel at an angle to its present position, and inserting or removing the same through the large open space in front of the side wall of the housing.

A person of only moderate mechanical ability can disassemble my pulley and replace it without any danger of weakening the housing. In contrast, if a two piece housing of the bolted type were used it would be necessary to use great care in staking the end threads when replacing the bolts to attain permanent strength. My wheel 11 may be removed for painting, repairs, etc., without any danger of losing permanent strength.

My invention is believed to be broad enough to cover a housing of the shape illustrated in the drawing even though such a housing was bolted together since with my novel shape it would be possible to insert or remove the wheel without unfastening the bolts, a great advantage. By permanently sealing all of the parts together a further advantage is obtained that there is no opportunity for the mechanic to follow the conventional method and disassemble the device by unfastening the bolts. Moreover such sealing methods as welding and casting create a much stronger construction than the bolted device, as well as a construction in which there is no possibility for disalignment of the side pieces or the ends of the shaft.

The vector diagram of Figure 4 shows that for small angles of inclination the force exerted on the bearings is many times the weight of the clothes. It can therefore be seen that a great advantage is gained by being able to cast the housing in but one piece.

The preferred form of my invention may be installed on a pole by first threading the line through the housing while the latter is still on the ground. The shaft 15 may then be removed and the wheel 11 allowed to advance against guides 20. The hook 25 which passes freely through the large hole in boss 24, held therein by the flange 26, can then be hooked into an eye on the pole. In thus hooking the rod 25, it must be advanced a distance C beyond the eye and then returned said distance after the end of 25 has passed into the eye. The wheel may then be replaced in its normal coaxial position with respect to the housing and the shaft reinserted.

In using my invention, two pulleys of the type shown are preferably employed, one at the house and one on a clothespole located a considerable distance from the house. The "endless" wire 23 surrounds both pulley wheels and is maintained relatively taut. To hang out the clothes it is merely necessary to stand near the house and place the clothes 28 on the line, pinning them thereto by pins 27. Ordinarily, the pins are placed near the front edge 28 of the clothes. Since the operator stands at the house, a considerable distance from the pole, it is difficult to ascertain just when the first piece of clothing 28 reaches wheel 11, except for my invention. As the first piece of clothing approaches wheel 11, the clothespin 27 strikes the inclined guide 20, 20. Since the slot in the guide is narrower than a clothespin, the pin is stopped by the guide. Due to the inclined relation of the guide any further advancement of the line will tend to force the pin tightly on the line to pinch the latter. This adds greatly to the impedance to rotation of the system and thereby indicates to the operator the fact that the full length of the line has been used and that further advancement of the line might soil or damage the clothes. To enable freedom of rotation of the shaft roller bearings 14 may be used. With a freely rotating pulley wheel, the operator is able to detect an increase in impedance to rotation thereof whenever the clothespin 27 strikes guides 20. Accordingly, clear and definite indications are given to the operator whenever the full length of the line has been used.

Should the operator place the pin 27 some distance behind the front edge 28 of the cloth, for example if it were at 37, the clothing would not be damaged in event the line is advanced until the pin 37 strikes the guides 20. This result is attained by using inclined guides since the clothing 28 can pass between the arms 20, 20 for the distance B before it touches the wheel 10 or the fender 22. In the actual pulley which I tested for an extended period of time the distance A of Figure 2 is about four inches. Accordingly in practice if the operator places the clothespin within four inches of the front edge of the clothing there is no danger of damaging the clothes. Under such conditions, the part of cloth 28 which extends in front of the clothespin 27 will merely pass into slot 20, 20 without being soiled thereby.

In this application for Letters Patent, I have chosen to describe my invention fully together with the details which I deem preferable. I have further pointed out a few modifications which I feel should be included in the scope of the patent claims.

I claim to have invented:

1. A pulley device for lines comprising a pulley wheel of large diameter as compared to its thickness, a removable shaft for said wheel, an integral housing supporting both ends of said shaft and defining axial openings of slightly greater diameter than that of the shaft through which the latter may be inserted or removed, the housing extending outwardly from said shaft in a plane perpendicular to the axis of the shaft for a distance greater than the radius of the wheel, said housing having a guard ring concentric with said wheel which extends circumferentially for considerably more than 180 degrees and which has a radius a short distance greater than the radius of the wheel whereby the wheel cannot be removed along radii that are perpendicular to the axis of the shaft, and means attached to said ring to support the housing jointly with the supporting action of the line, said ring being wider than the wheel and unslotted throughout the two quadrants which extend ninety degrees each side of said means, said ring defining elongated slots of a width greater than that of the line but narrower than the wheel to guide the line, the slots beginning at opposite ends of a diameter of the housing each of which ends being substantially ninety degrees from said supporting means, whereby the line may be threaded through the device by merely placing it in one of the slots and continuing to advance it; said housing comprising a framework-means supporting said ring, sufficiently wider than the wheel, and extending adjacent the wheel on one side thereof to such an extent that the wheel may, upon removing said shaft, be moved to an acute angle with respect to its normal position from which angle the wheel may be removed from inside said housing without disassembling the parts of said housing.

2. In a pulley mechanism for lines, in combination, a pulley wheel, a removable shaft for the wheel, housing means comprising a rib structure on each side of the wheel supporting said removable shaft and a rim connecting said rib structures; said rib structures being of such a limited extent and one side thereof being offset from the wheel to such an extent that upon removing the shaft the wheel may be moved to an acute angle with respect to its normal position at which angle the wheel may be removed from said housing means along a plane that intersects the plane of the normal position of the wheel at an acute angle, said rim surrounding the periphery of said wheel to an extent that the wheel cannot be removed from said housing in a plane perpendicular to the axis of said shaft.

3. The combination with a clothesline adapted to be used in a horizontal position of a pulley wheel for the clothesline, side pieces journaling said pulley wheel, and a fender connecting said side pieces; said fender being located adjacent the periphery of said wheel and defining a line-guiding slot which is appreciably wider than the line and contains the line and is narrower than a clothespin, said line guiding slot extending at least from the point on said fender which is radially outward from the point on said wheel where the line first contacts said wheel to the point on said fender which is horizontally in front of said point of contact when said clothesline is in horizontal use.

ODESSA McCANN MANNING.